(12) United States Patent
Katzenberger et al.

(10) Patent No.: US 9,050,668 B2
(45) Date of Patent: Jun. 9, 2015

(54) METHOD OF CUTTING A SLOT

(71) Applicant: The Boeing Company, Chicago, IL (US)

(72) Inventors: Michael D. Katzenberger, St. Charles, MO (US); Ike C. Schevers, Festus, MO (US); Anthony P. Slade, St. Ann, MO (US); Steve L. Arana, Collinsville, IL (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/080,312

(22) Filed: Nov. 14, 2013

(65) Prior Publication Data

US 2014/0069254 A1 Mar. 13, 2014

Related U.S. Application Data

(62) Division of application No. 12/194,994, filed on Aug. 20, 2008, now Pat. No. 8,651,780.

(51) Int. Cl.
*B23C 1/06* (2006.01)
*B23C 3/12* (2006.01)
*B23C 3/28* (2006.01)
*B23Q 9/00* (2006.01)

(52) U.S. Cl.
CPC .............. *B23C 3/28* (2013.01); *B23Q 9/0042* (2013.01)

(58) Field of Classification Search
CPC ........ B23C 2270/18; B23C 3/28; B23C 3/30; B23C 3/13; B23C 1/007; B23C 1/005; B23C 1/20; B23C 2215/04; B23C 2215/045; B23C 2220/40; B23C 2255/04; B23C 2255/08; B23C 2255/12; B23Q 9/0007; B23Q 9/0014; B23Q 9/0028
USPC ............ 409/178, 179, 175; 408/702, 13–132, 408/143
See application file for complete search history.

(56) References Cited

U.S. PATENT DOCUMENTS

| 2,696,763 A | 12/1954 | Daugherty et al. |
| 2,842,238 A * | 7/1958 | Shaw et al. .................... 409/179 |
| 2,983,199 A | 5/1961 | Daugherty |
| 3,476,161 A | 11/1969 | Dunlap |
| 3,575,364 A | 4/1971 | Frederick |

(Continued)

FOREIGN PATENT DOCUMENTS

| CH | 603291 | 8/1978 |
| EP | 1918067 A2 | 5/2008 |

(Continued)

OTHER PUBLICATIONS

PCT Partial International search for application PCT/US2009/048903, Nov. 25, 2009, 3 pages.

(Continued)

*Primary Examiner* — David Bryant
*Assistant Examiner* — Jason L Vaughan
(74) *Attorney, Agent, or Firm* — Yee & Associates, P.C.

(57) ABSTRACT

A method of cutting a slot using an apparatus comprising a carriage that is movable along an axis, a cutting tool, and a depth controller. The cutting tool may be removably attached to the carriage. The depth controller may be used to select a cutting depth of the cutting tool with respect to a surface of a workpiece closest to a part.

7 Claims, 6 Drawing Sheets

(56) References Cited

U.S. PATENT DOCUMENTS

| | | |
|---|---|---|
| 3,650,178 A | 3/1972 | Appleton |
| 3,722,497 A | 3/1973 | Hiestand et al. |
| 3,730,634 A | 5/1973 | Gerber et al. |
| 3,848,512 A | 11/1974 | Erhardt |
| 3,935,788 A | 2/1976 | Gilmore |
| 4,061,076 A | 12/1977 | Robertson |
| 4,162,565 A | 7/1979 | Rubenzer |
| 4,297,061 A | 10/1981 | Wolfe et al. |
| 4,382,728 A | 5/1983 | Anderson et al. |
| 4,676,700 A | 6/1987 | Peddinghaus |
| 4,749,314 A | 6/1988 | LeBlond |
| 4,777,707 A | 10/1988 | Kirscher |
| 4,787,786 A | 11/1988 | Freud et al. |
| 4,911,589 A | 3/1990 | Winkler et al. |
| 4,934,422 A | 6/1990 | Hempy et al. |
| 4,944,205 A | 7/1990 | Ricci |
| 5,044,075 A | 9/1991 | Brennan et al. |
| 5,123,790 A | 6/1992 | King |
| 5,340,247 A | 8/1994 | Cuneo et al. |
| 5,524,328 A | 6/1996 | Hardesty |
| 5,551,813 A | 9/1996 | Bonnett |
| 5,632,579 A | 5/1997 | Susnjara |
| 5,807,035 A | 9/1998 | Lewin |
| 6,196,286 B1 | 3/2001 | Susnjara |
| 6,244,189 B1 | 6/2001 | Kingsley |
| 6,732,621 B2 | 5/2004 | Iwata et al. |
| 6,966,731 B2 | 11/2005 | VanderPol et al. |
| 7,014,393 B2 | 3/2006 | Matheis |
| 7,270,505 B2 | 9/2007 | VanderPol et al. |
| 7,665,200 B1 | 2/2010 | Shimooka |
| 7,677,846 B2 | 3/2010 | VanderPol et al. |
| 7,914,243 B2 | 3/2011 | VanderPol et al. |
| 2005/0016350 A1 | 1/2005 | Momose et al. |
| 2010/0043618 A1 | 2/2010 | Katzenberger et al. |

FOREIGN PATENT DOCUMENTS

| | | |
|---|---|---|
| JP | 62152602 A | 7/1987 |
| WO | WO2006012268 A2 | 2/2006 |

OTHER PUBLICATIONS

Final office action dated Dec. 31, 2012 regarding U.S. Appl. No. 12/194,994, 14 pages.

Non-final office action dated Apr. 10, 2012 regarding U.S. Appl. No. 12/194,994, 22 pages.

Notice of allowance dated Aug. 13, 2013 regarding U.S. Appl. No. 12/194,994, 12 pages.

\* cited by examiner

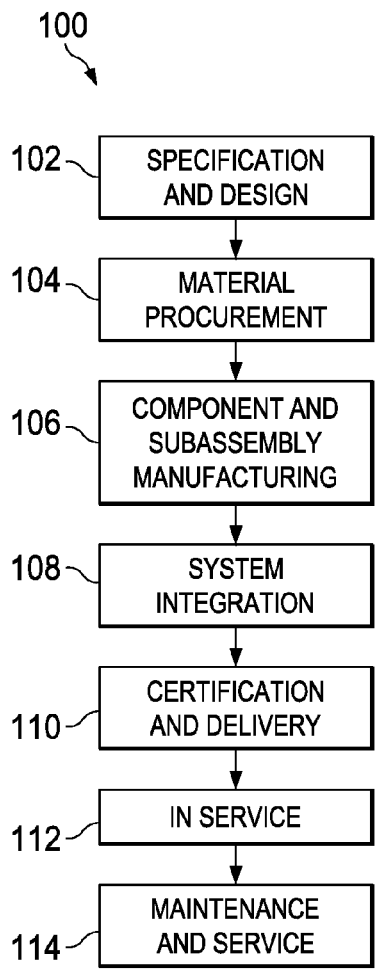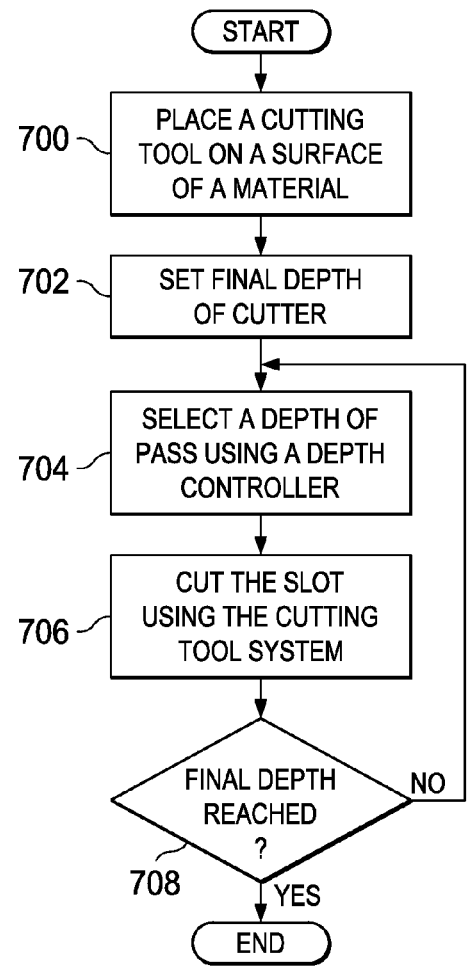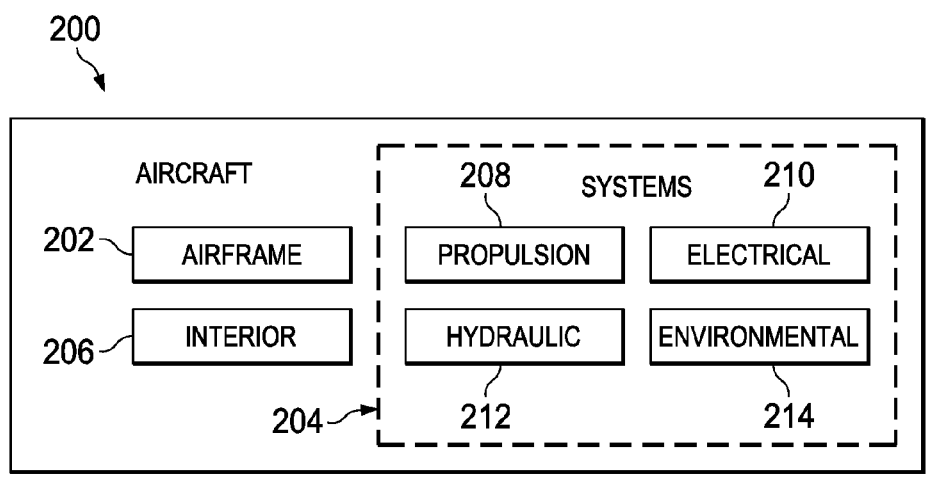

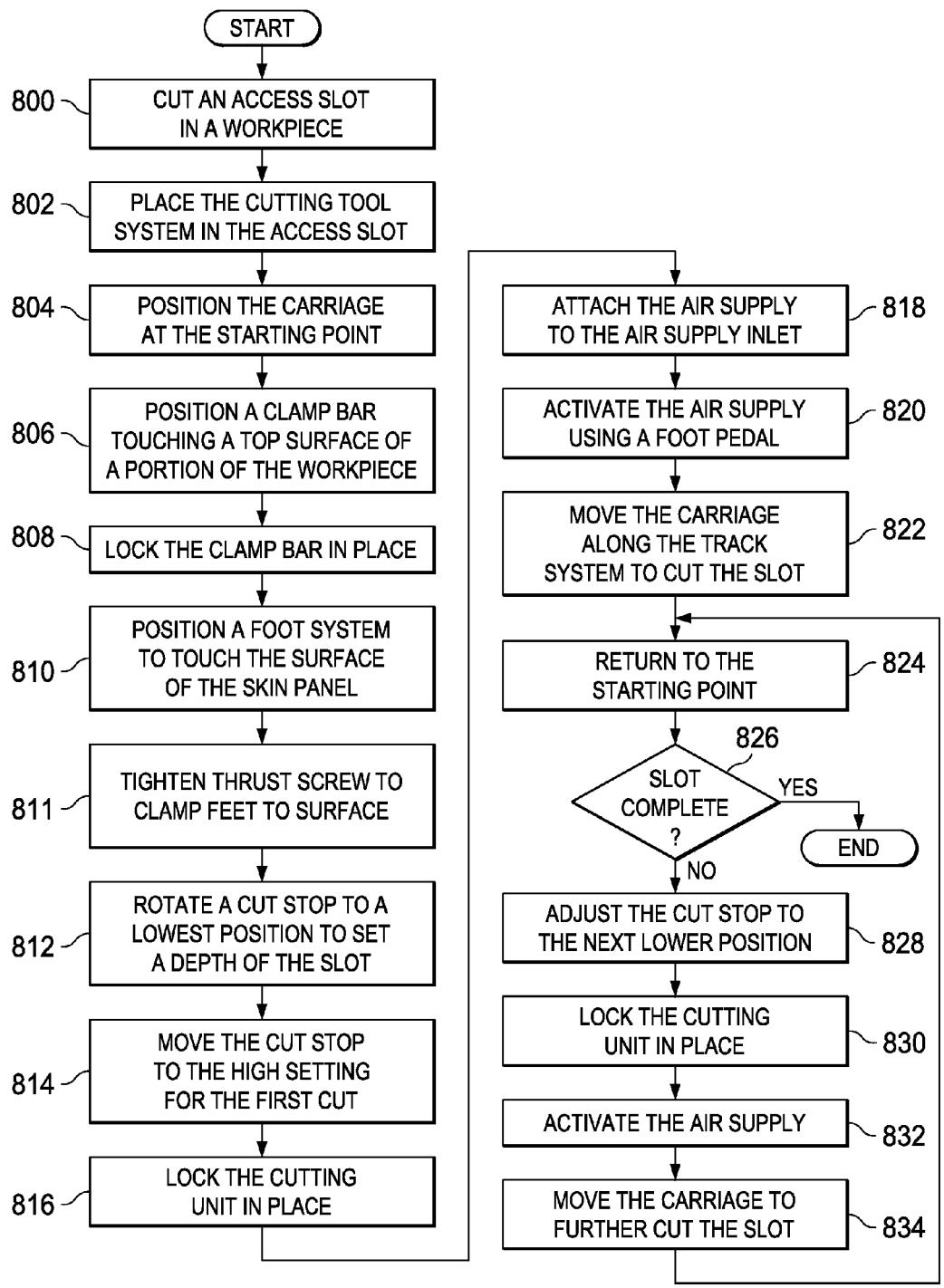

METHOD OF CUTTING A SLOT

This application is a divisional of U.S. patent application Ser. No. 12/194,994, filed Aug. 20, 2008.

BACKGROUND INFORMATION

1. Field

The present disclosure relates generally to cutting materials and in particular to a method and apparatus for cutting slots in materials. Still more particularly, the present disclosure relates to a method and apparatus for creating slots to separate parts.

2. Background

During manufacturing and/or maintenance, it may be necessary to remove parts from an aircraft. For example, without limitation, during assembly of an aircraft wing, it may be necessary to remove a spar or some other part for any number of reasons. During maintenance or other post-assembly operations, it may be desirable to replace parts.

For example, without limitation, a spar may be removed from the interior of an aircraft wing, and a new spar may be put in its place. When a spar is already present within an aircraft wing, a spar may not be easily removable without cutting the spar into multiple pieces. This situation may arise because of a lack of space within an assembled aircraft wing.

When removing a spar from an aircraft wing, it may be necessary to cut through the spar down to near the skin panel to which the spar may be attached. The skin panel may be a metallic, composite and metallic or composite skin panel. As a result, it may be important to not touch and/or cut into the skin panel, while cutting the spar into multiple pieces. It may be undesirable for a cutting tool to touch and/or cut into a skin panel. Touching or trimming the skin panel may extend the rework beyond the original scope of the project.

Currently, cuts may be made into the spar by hand. An operator may employ a cutting tool by hand to cut through the spar. The operator may make successive cuts deeper into the spar in an attempt to create a cut that may be deep enough to allow for separation of the spar into multiple pieces without touching and/or cutting into the skin panel. Large portions of the spar may be cut away leaving smaller portions that may be attached to the skin panel. These portions may be removed in pieces. The cuts made into the portions of the spar that may be attached to the skin panel may take the form of slots. These slots may be cut within $1/1,000$ to $1/100$ of an inch to the surface of the skin panels without touching the skin panels.

This type of operation may be very time consuming. Further, expenses may increase if cuts touch and/or extend into the skin panel.

Accordingly, a need is present for a method and apparatus to minimize the time and effort needed to remove parts that overcome the problems discussed above.

SUMMARY

The advantageous embodiments provide a method of cutting a slot in a workpiece. A cutting tool may be removably attached to a carriage to provide a cutting tool system. The cutting tool system may be placed on the workpiece. The cutting tool system may comprise a carriage. A depth of the slot may be selected using a depth controller. The slot may be cut with the cutting tool system.

In another advantageous embodiment, a method of cutting a slot in a workpiece attached to a skin panel may be present. An access slot may be cut in the workpiece. A cutting tool system may be placed into the access slot. The cutting tool system may comprise a frame, a set of tracks attached to the frame, a carriage configured to move along the set of tracks, a cutting tool capable of being removably attached to the carriage, and a depth controller capable of controlling a cutting depth of the cutting tool with respect to a surface of a part. The carriage may be positioned at a starting point. A foot system may be adjusted to touch a surface of the skin panel. The cutting tool system may be secured to the workpiece. A depth of the slot may be selected using the depth controller. The cutting tool may be activated. The carriage may be moved along the set of tracks to cut the slot. The positioning step, the selecting step, and the activating step may be repeated until the slot has a desired depth.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 1 is a flow diagram of an aircraft production and service methodology in which an advantageous embodiment may be implemented;

FIG. 2 is a block diagram of an aircraft in accordance with an advantageous embodiment;

FIG. 7 is a high level flowchart of a process for cutting a slot in a part in accordance with an advantageous embodiment; and FIG. 8 is a flowchart of a process for cutting a slot in a part attached to a skin panel in accordance with an advantageous embodiment.

DETAILED DESCRIPTION

Figure 3:
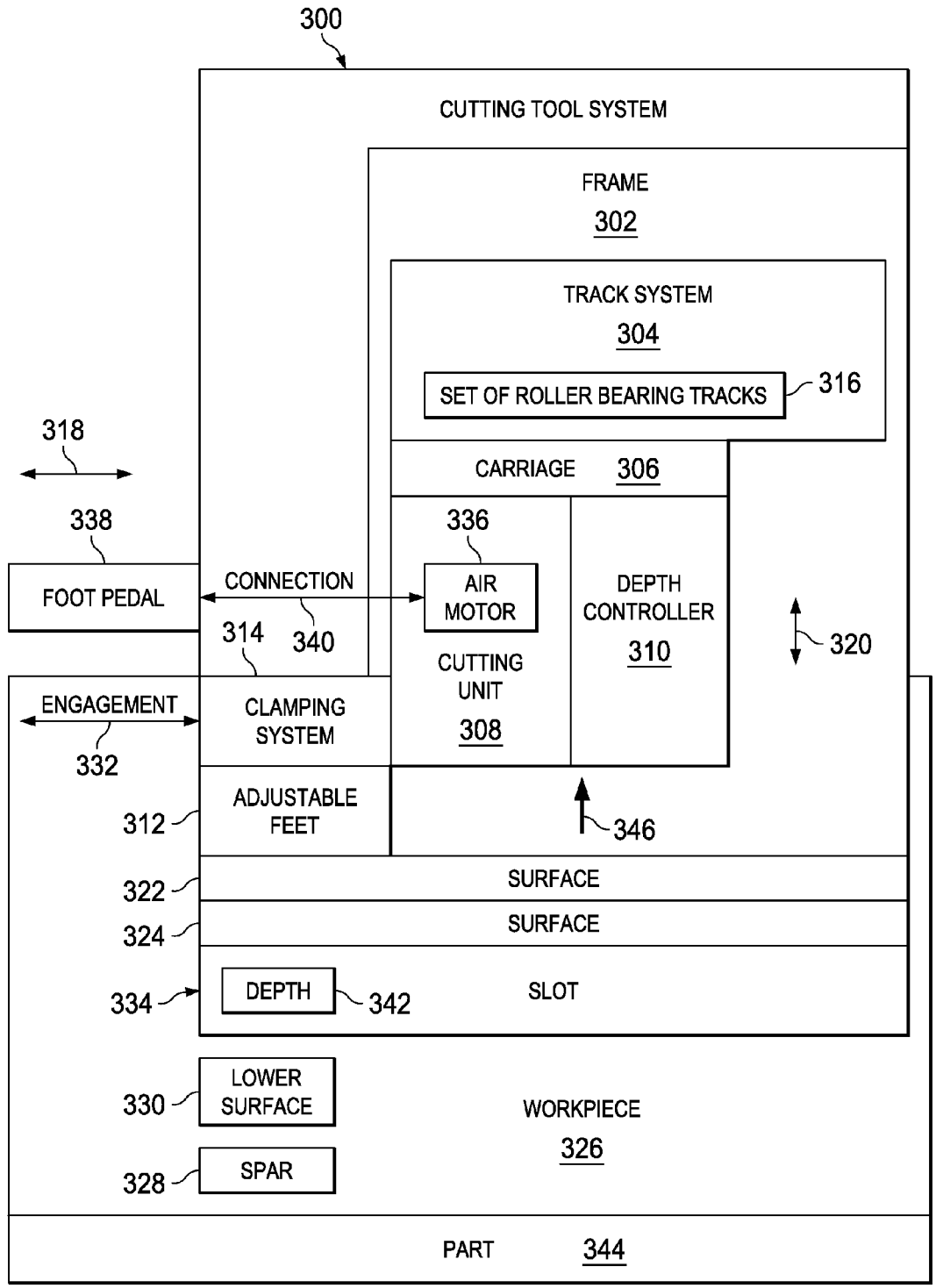
FIG. 3 is a block diagram of a cutting tool system in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service 112.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114. As a specific example, the different advantageous embodiments may be implemented during maintenance and service 114 to cut slots in parts to be removed from airframe 202 in aircraft 200. The advantageous embodiments also may be applied to other stages of aircraft manufacturing and service method 100 whenever cuts are to be made into a structure within aircraft 200.

The different advantageous embodiments recognize and take into account difficulties involved with cutting parts to be removed. In particular, the different advantageous embodiments recognize and take into account that cutting and/or removing a spar from inside of a wing may be a time consuming and difficult operation in order to avoid touching or trimming a skin panel.

Thus, the different advantageous embodiments provide a method and apparatus for cutting a material. In the different advantageous embodiments, an apparatus may include a frame, a set of roller tracks attached to the frame, a carriage, a cutting tool, and a depth controller. A set, as used herein, refers to one or more items. For example, without limitation, a set of roller tracks is one or more roller tracks.

With reference now to FIG. 3, a block diagram of a cutting tool system is depicted in accordance with an advantageous embodiment. In this example, cutting tool system 300 may include frame 302, track system 304, carriage 306, cutting unit 308, depth controller 310, adjustable feet 312, and clamping system 314.

Track system 304 may be attached to frame 302. Track system 304 may take various forms. For example, without limitation, track system 304 may be a set of tracks, such as set of roller bearing tracks 316. In other examples, track system 304 may include, for example, without limitation, linear motion devices and/or other suitable mechanisms. For example, without limitation, set of roller bearing tracks 316 may be two or more roller bearing tracks that may be positioned parallel to each other on frame 302. In other illustrative examples, three roller bearing tracks may be present on frame 302.

Carriage 306 may be configured to move along track system 304. In this example, carriage 306 may move horizontally along the direction of arrow 318. In other words, carriage 306 is a moveable carriage that is moveable along an axis as shown by arrow 318. Further, cutting unit 308 may be removably attached to carriage 306. Carriage 306 may move cutting unit 308 along the direction of arrow 318 when cutting operations are performed using cutting unit 308.

Cutting unit 308 may take various forms. For example, without limitation, cutting unit 308 may be a dove tail cutter, a slotting cutter, a contour cutter, an end mill cutter, a rotary file and/or some other suitable cutting tool. In these examples, depth controller 310 may be capable of controlling the movement of cutting unit 308 along a vertical axis, as illustrated by arrow 320. As depicted, surface 322 of frame 302 may be placed on surface 324 of workpiece 326. Adjustable feet 312 may comprise adjustable members that may contact surface 324 and/or lower surface 330 of workpiece 326. In these illustrative examples, workpiece 326 may be, for example, without limitation, spar 328. Workpiece 326 also may take other forms. For example, without limitation, workpiece 326 may be a rivet to be shaved, a skin panel being trimmed, a rib in which a groove may be formed, and/or some other suitable object.

Clamping system 314 may hold frame 302 in place with respect to workpiece 326. In this manner, frame 302 may be securely placed and/or attached to workpiece 326 to perform a cutting operation. Clamping system 314 may engage workpiece 326 as shown by arrow 332.

After frame 302 has been clamped and/or secured to workpiece 326, cutting unit 308 may be positioned vertically along arrow 320 to cut slot 334 into surface 324 of workpiece 326. The positioning of cutting unit 308 on carriage 306 may be controlled by depth controller 310.

Cutting unit 308 may be powered using a motor such as, for example, without limitation, air motor 336. Use of air motor 336 may allow cutting tool system 300 to be used in locations in which combustible and/or explosive vapors may be present. Of course, in other advantageous embodiments, an electric motor may be used in place of air motor 336, depending on the particular implementation.

In these examples, operation of air motor 336 may be performed using foot pedal 338, which may be connected to air motor 336 through connection 340. Connection 340 may be, for example, without limitation, an air line, in these examples. Foot pedal 338 may allow an operator to free up the operator's hands to control cutting tool system 300 throughout the operation of creating slot 334 in workpiece 326.

As cutting unit 308 cuts into workpiece 326 to create slot 334, carriage 306 may be moved along track system 304 to create slot 334. Depth 342 for slot 334 may be controlled using depth controller 310. Depth controller 310 may be capable of moving and/or controlling the position of cutting unit 308 along axis 346, which may be substantially normal to surface 324. In this manner, slot 334 may be cut into workpiece 326 without reaching and/or touching part 344.

In these illustrative examples, part 344 may be, for example, without limitation, a skin panel or some other suitable component. Workpiece 326 may be comprised of various materials. For example, without limitation, workpiece 326 may be comprised of a material such as aluminum, a composite material, steel, wood, titanium, plastic, ceramic, or some other suitable material.

The illustration of cutting tool system 300 in FIG. 3 is provided for purposes of illustrating different features that may be present in various advantageous embodiments. The illustration of cutting tool system 300 in FIG. 3 is not meant to imply physical and/or architectural limitations to the manner in which different advantageous embodiments may be implemented.

For example, without limitation, although the different examples illustrate a capability of moving cutting unit 308 in one axis in a horizontal direction and in a vertical direction, in other advantageous embodiments, cutting unit 308 may be moveable around three axes.

In yet other advantageous embodiments, adjustable feet 312 may not be present within cutting tool system 300. In still other advantageous embodiments, cutting tool system 300 may include an additional carriage in addition to carriage 306 and/or carriage 306 may support a second cutting tool to provide a capability to cut or form another slot in addition to slot 334.

Figure 4:
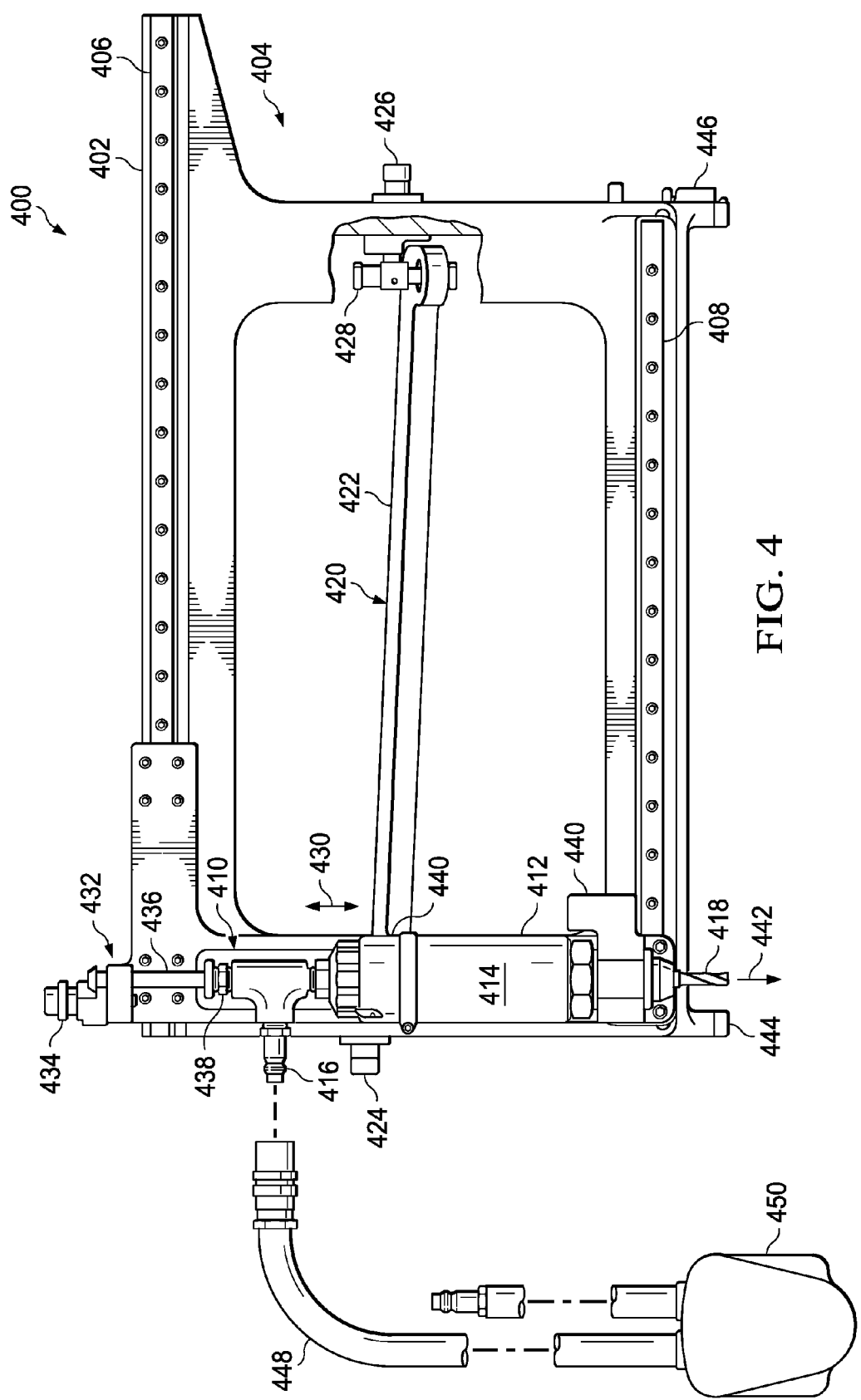
FIG. 4 is a diagram of a cutting tool system in accordance with an advantageous embodiment.

With reference now to FIG. 4, a diagram of a cutting tool system is depicted in accordance with an advantageous embodiment. In this example, cutting tool system 400 is an example of one implementation of cutting tool system 300 in FIG. 3.

As illustrated, cutting tool system 400 includes frame 402 with track system 404. Track system 404 may be comprised of roller bearing track 406 and roller bearing track 408. Cutting tool system 400 also may include carriage 410, which may be attached to and removed from roller bearing track 406 and roller bearing track 408.

In this depicted example, cutting unit 412 may be attached to and removed from carriage 410. Cutting unit 412 may include air motor 414, air supply inlet 416, and end mill cutter 418.

Cutting tool system 400 also may include clamping system 420. In this illustrative example, clamping system 420 may include clamp bar 422, clamp lock 424, clamp lock 426, and clamp bar thrust screw 428. Frame 402 is shown with a cutaway to allow viewing of clamp bar thrust screw 428. Clamp bar thrust screw 428 may push foot 444 and foot 446 to a surface (not shown). Clamp bar 422 may move vertically along the direction of arrow 430 in these examples. When positioned in a desired level and/or location, clamp bar 422 may be locked into place using clamp lock 424 and/or clamp lock 426.

In these illustrative examples, depth controller 432 may comprise cut stop 434, adjustment screw 436, lock nut 438, and depth set unit 440. Cut stop 434 may be connected to cutting unit 412 through adjustment screw 436 and lock nut 438. Further, depth set unit 440 may lock cutting unit 412 into place within carriage 410. Cut stop 434 may be adjusted to control the depth at which cutting unit 412 may reach. Cut stop 434 may allow for a number of different cutting positions. Cut stop 434 may be implemented using any mechanism that may be capable of providing different cutting positions. In particular, cut stop 434 may be used to adjust the depth of cutter 418 along axis 442.

Cutting tool system 400 also may include a set of feet, such as, for example, without limitation, foot 444 and foot 446. Two other feet may be present, which are not shown in this view.

Air supply inlet 416 may be connected to air hose 448. Air supplied to air motor 414 by air hose 448 may be controlled by foot pedal 450. With the use of foot pedal 450, an operator may control cutting unit 412 with a foot, allowing both hands to be free to handle cutting unit 412 and/or frame 402. For example, without limitation, an operator may use one or both hands to move cutting unit 412 on carriage 410 along track system 404 while performing cutting operations.

Figure 5:
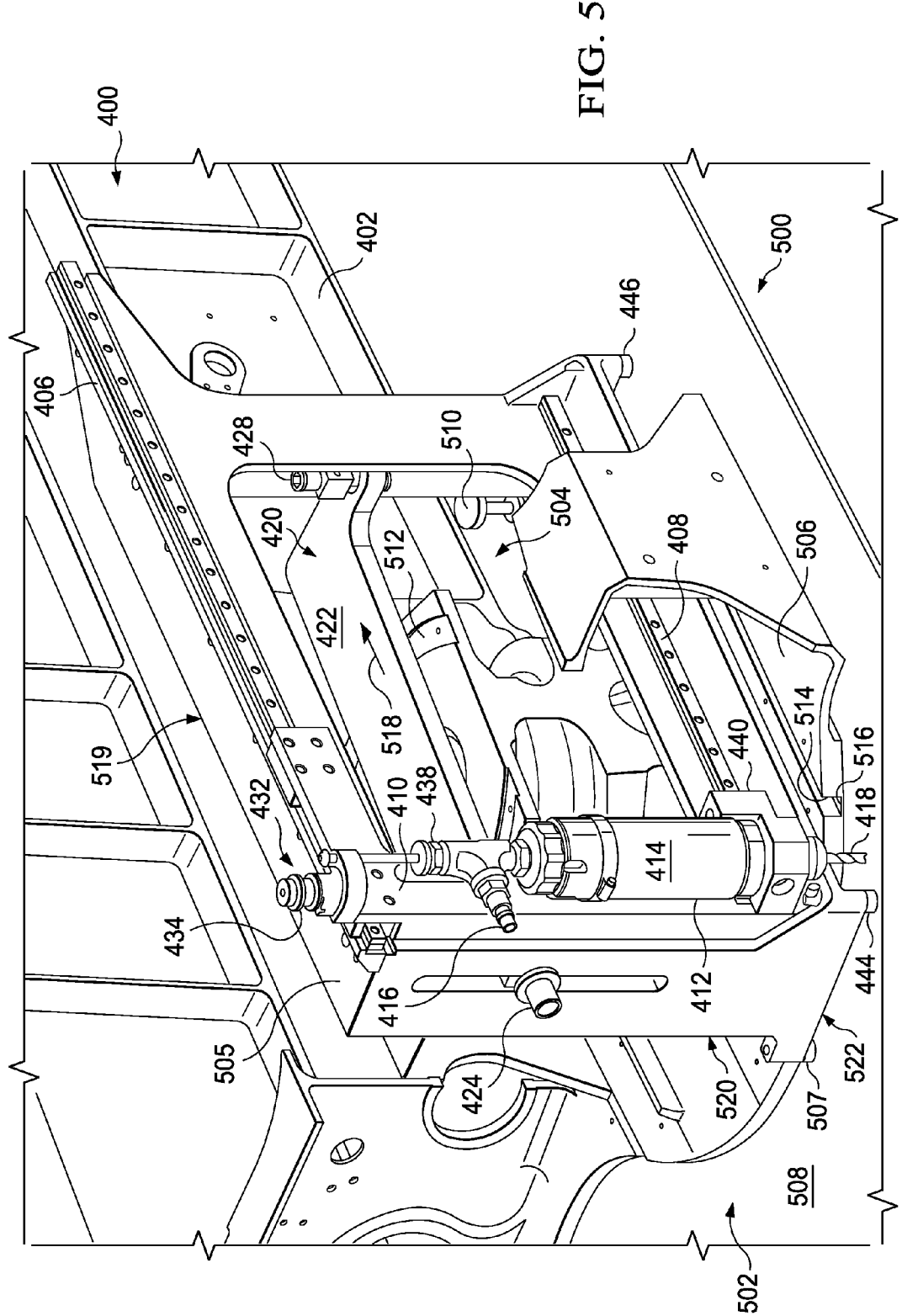
FIG. 5 is a perspective view of a cutting tool system attached to a workpiece in accordance with an advantageous embodiment.

With reference now to FIG. 5, a perspective view of a cutting tool system attached to a workpiece is depicted in accordance with an advantageous embodiment. In this example, cutting tool system 400 is shown in a perspective view with respect to spar 500.

Spar 500 may be attached to skin panel 502. In this illustrative example, spar 500 may be selected for removal from skin panel 502. In this illustration, access slot 504 may be present in spar 500. Access slot 504 may allow cutting tool system 400 to be placed onto surface 506 of spar 500.

Foot 444, foot 446, and foot 507 may touch surface 508 of skin panel 502. Adjustable foot 510, also on frame 402, may be adjusted to touch surface 508 of skin panel 502. In this illustrative example, carriage 410 may be positioned at starting point 505.

Clamp bar 422 may be positioned to touch surface 512, of spar 500, to secure and/or lock cutting tool system 400 into place. Clamp lock 424 and clamp lock 426 (not shown) may be adjusted to clamp bar 422 in place on surface 512 of spar 500.

Cut stop 434 may be adjusted to a lowest position for creating slot 514 in spar 500 with end mill cutter 418. This adjustment may be made to provide a depth leaving around 0.01 inches in section 516, in this illustrative example. Of course, other depths may be left in section 516 depending on the particular implementation. For example and without limitation, a depth of around 0.1 inches, around 0.001 inches, or some other suitable depth may be selected for section 516. The depth may depend on the number of steps present within cut stop 434.

Thereafter, cut stop 434 may be adjusted to a highest setting in preparation for an initial cut. Cutting unit 412 may be locked into place using depth set unit 440. Cutting unit 412 may then be activated by activating the air supply to air supply inlet 416.

Carriage 410 may be moved along roller bearing track 406 and roller bearing track 408 in the direction of axis 518 to cut slot 514 into spar 500. When a cut is made into slot 514, carriage 410 may be moved back to starting point 505. Cut stop 434 may be adjusted to lower end mill cutter 418 to a next level. Then, another cut may be made into spar 500 to increase the depth of slot 514. This process may be repeated until section 516 is reached. Section 516 may be reached without touching and/or cutting into surface 508 of skin panel 502.

The dimensions of cutting tool system 400 may vary depending on the particular implementation. In these examples, cutting tool system 400 may have a size that makes this system portable and useable within a wing of an aircraft to cut slots into structures such as, for example, without limitation, spar 500. Cutting tool system may have length 519 of around 21.0 inches, height 520 of around 13.0 inches, and width 522 of around 5.0 inches. Of course, the dimensions may vary depending on the particular implementation selected. Further, cutting tool system 400 also may provide a size advantage based on its design and/or configuration in these examples.

The illustration of cutting tool system 400 in FIGS. 4 and 5 has been presented as one implementation of cutting tool system 300 in FIG. 3. This illustration is not meant to imply physical and/or architectural limitations to the manner in which other advantageous embodiments may be implemented.

For example, without limitation, in other advantageous embodiments, a different tool other than end mill cutter 418 may be used. For example, without limitation, a bit and/or tool in the form of a dove tail cutter, a slotting cutter, a contour cutter, or some other suitable tool may be used. As another non-limiting example, three tracks may be used instead of roller bearing track 406 and roller bearing track 408.

Figure 6:
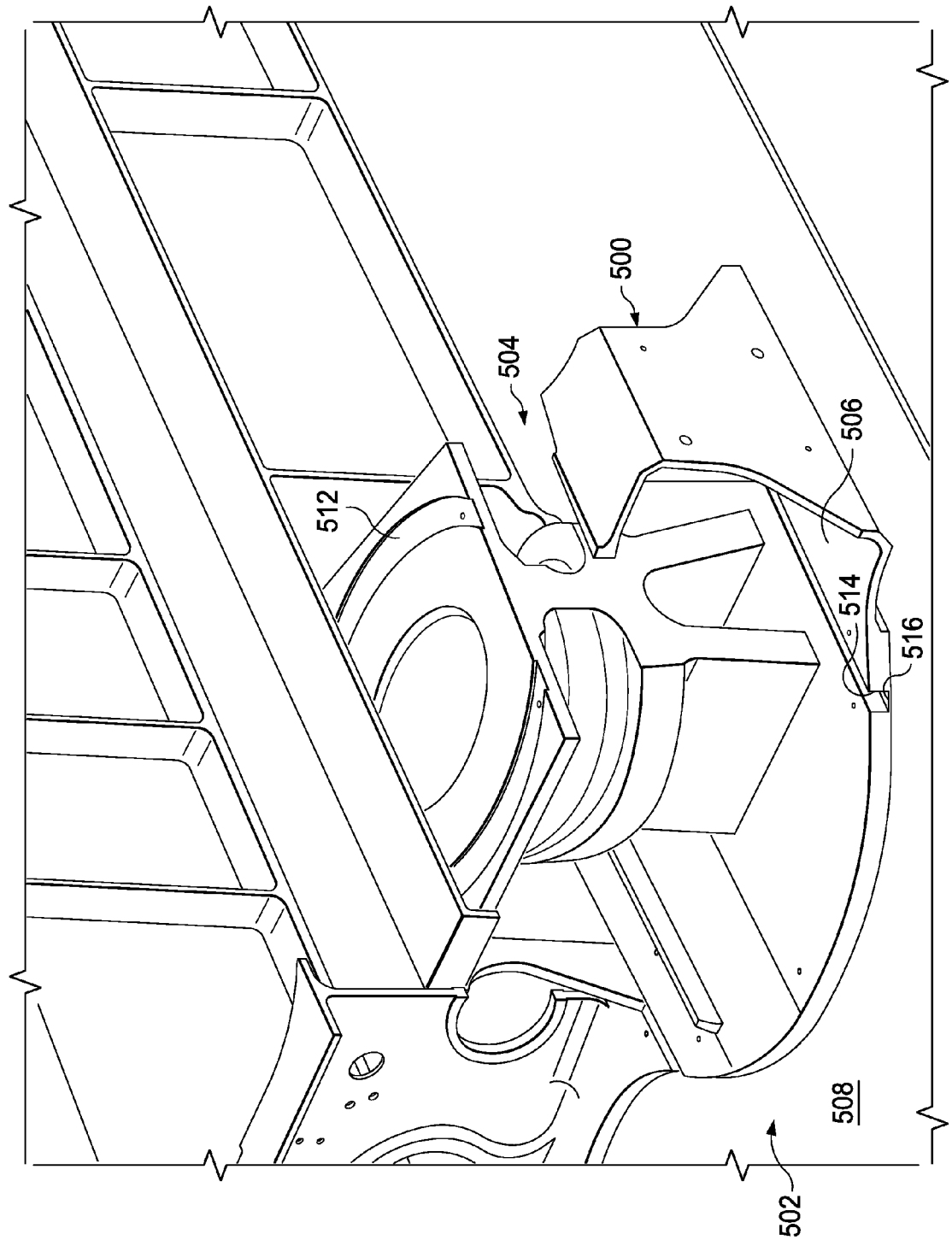
FIG. 6 is a perspective view of a workpiece and a part in accordance with an advantageous embodiment

With reference now to FIG. 6, a perspective view of a workpiece and a part is depicted in accordance with an advantageous embodiment. In this example, spar 500 is shown with access slot 504 and slot 514 after cutting operations have been completed using cutting tool system 400.

With reference now to FIG. 7, a high level flowchart of a process for cutting a slot in a part is depicted in accordance with an advantageous embodiment. The process illustrated in FIG. 7 is an example of a process that may be implemented using cutting tool system 300 in FIG. 3.

The process may begin by placing cutting tool system 300 on surface 324 of a material (operation 700). The final depth of a cutter may be set (operation 702). The process may select a depth of a pass using depth controller 310 in the cutting tool system (operation 704). In operation 704, the pass may be one of a number of passes used to form the slot. Each pass may make a deeper cut into the part to form the slot. Thereafter, the process may cut the slot using the cutting tool system (operation 706). A determination may be made as to whether the final depth has been reached (operation 708). If the final depth has been reached, the process may terminate. Otherwise, the process may return to operation 704 to select a new depth for a pass.

With reference now to FIG. 8, a flowchart of a process for cutting a slot in a workpiece attached to a skin panel is depicted in accordance with an advantageous embodiment. The process illustrated in FIG. 8 may be implemented using a cutting tool system, such as cutting tool system 300 in FIG. 3.

The process may begin by cutting access slot 504 in workpiece 326 (operation 800). This access slot may be cut having a width to allow placement of cutting tool system 400 onto surface 506 of workpiece 326 where slot 514 may be desired. This operation may be performed by an operator using an existing access hole or port in the aircraft. This operation may be performed using cutting tool system 400, or some other suitable tool. Cutting tool system 400 may be placed into the access slot (operation 802). Carriage 410 may be positioned at starting point 505 (operation 804).

Next, clamp bar 432 may be positioned touching a top surface of a portion of workpiece 326 (operation 806). The process may then lock clamp bar 432 in place (operation 808). This operation may secure the cutting tool system to part 344. A foot system, such as adjustable feet 312, may be positioned to touch the surface of skin panel 502 (operation 810). Feet 444 and 446 may be clamped to the surface (operation 811). In operation 811, clamp bar thrust screw 428 may be tightened to clamp the feet to the surface of skin panel 502.

Cut stop 434 may be rotated to a lowest position to set a depth of slot 514 (operation 812). In the illustrative examples, the lowest position may identify the amount of material left in the part when slot 514 is complete. The process may move cut stop 434 to the high setting for the first cut (operation 814). The process may then lock cutting unit 412 in place in the carriage (operation 816).

The air supply, such as, for example, without limitation, air motor 414, may be attached to air supply inlet 416 (operation 818). The air supply may be activated using foot pedal 450 (operation 820). Carriage 412 may be moved along track system 404 to cut slot 514 (operation 822). The process then may return to the starting point (operation 824).

A determination may be made as to whether slot 514 is complete (operation 826). If slot 514 is not complete, cut stop 434 may be adjusted to a next lower position (operation 828). The process may lock cutting unit 412 in place (operation 830). The process may activate the air supply provided by air motor 414 (operation 832). The process may then move carriage 410 to further cut slot 514 (operation 834), with the process returning to operation 824. In these examples, each cut may increase the depth of slot 514. With reference back to operation 826, if slot 514 has been completed, the process terminates.

Thus, the different advantageous embodiments may provide a method and apparatus for cutting slot 334 in workpiece 326. In the different advantageous embodiments, an apparatus may have frame 302, track system 304, carriage 306, cutting unit 308, and depth controller 310. Track system 304 may be attached to frame 302 with carriage 306 being configured to move along track system 304. Cutting unit 308 may be removably attached to carriage 306. Depth controller 310 may control the cutting depth of cutting unit 308 with respect to surface 324 of workpiece 326.

Thus, the different advantageous embodiments provide a capability to remove older workpieces. The different advantageous embodiments provide a capability to control the depth of a slot cut to remove a workpiece. These cuts may be selected to avoid touching and/or cutting into a workpiece that may be below the workpiece being removed. The amount of time and effort needed and risk to cut a slot may be substantially reduced using the different advantageous embodiments.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of cutting a slot in a workpiece, the method comprising:
    attaching a cutting tool to a carriage to provide a cutting tool system, the cutting tool being removable;
    placing the cutting tool system on the workpiece;
    cutting an access slot in the workpiece;
    placing the cutting tool system into the access slot prior to cutting the slot;
    selecting a depth of the slot using a depth controller; and
    cutting the slot with the cutting tool system.

2. The method of claim 1 further comprising:
    positioning the carriage at a starting point prior to cutting the slot.

3. The method of claim 1, further comprising:
    adjusting a foot system to touch a surface of a part; and
    securing the cutting tool system to the workpiece.

4. The method of claim 1, wherein the cutting step comprises:
    activating the cutting tool; and
    moving the carriage along a set of tracks to cut the slot.

5. The method of claim 1, wherein the cutting tool system further comprises a frame, a set of tracks attached to the frame, and the depth controller capable of controlling a cutting depth of the cutting tool with respect to a surface of the workpiece, wherein the carriage is configured to move along the set of tracks.

6. The method of claim 1 further comprising:
repeating the selecting and cutting steps until the slot has a desired depth.

7. A method of cutting a slot in a workpiece attached to a skin panel, the method comprising:
cutting an access slot in the workpiece;
placing a cutting tool system into the access slot, wherein the cutting tool system comprises a frame; a set of tracks attached to the frame; a carriage configured to move along the set of tracks; a cutting tool capable of being removably attached to the carriage; and a depth controller capable of controlling a cutting depth of the cutting tool with respect to a surface of a part;
positioning the carriage at a starting point;
adjusting a foot system to touch a surface of the skin panel;
securing the cutting tool system to the workpiece;
selecting a depth of the slot using the depth controller;
activating the cutting tool;
moving the carriage along the set of tracks to cut the slot; and
repeating the positioning step, the selecting step, and the activating step until the slot has a desired depth.

* * * * *